Aug. 19, 1952  E. P. COX  2,607,149
DEVICE FOR DISENGAGING FISHHOOKS OR THE LIKE
Filed Feb. 3, 1950  2 SHEETS—SHEET 1
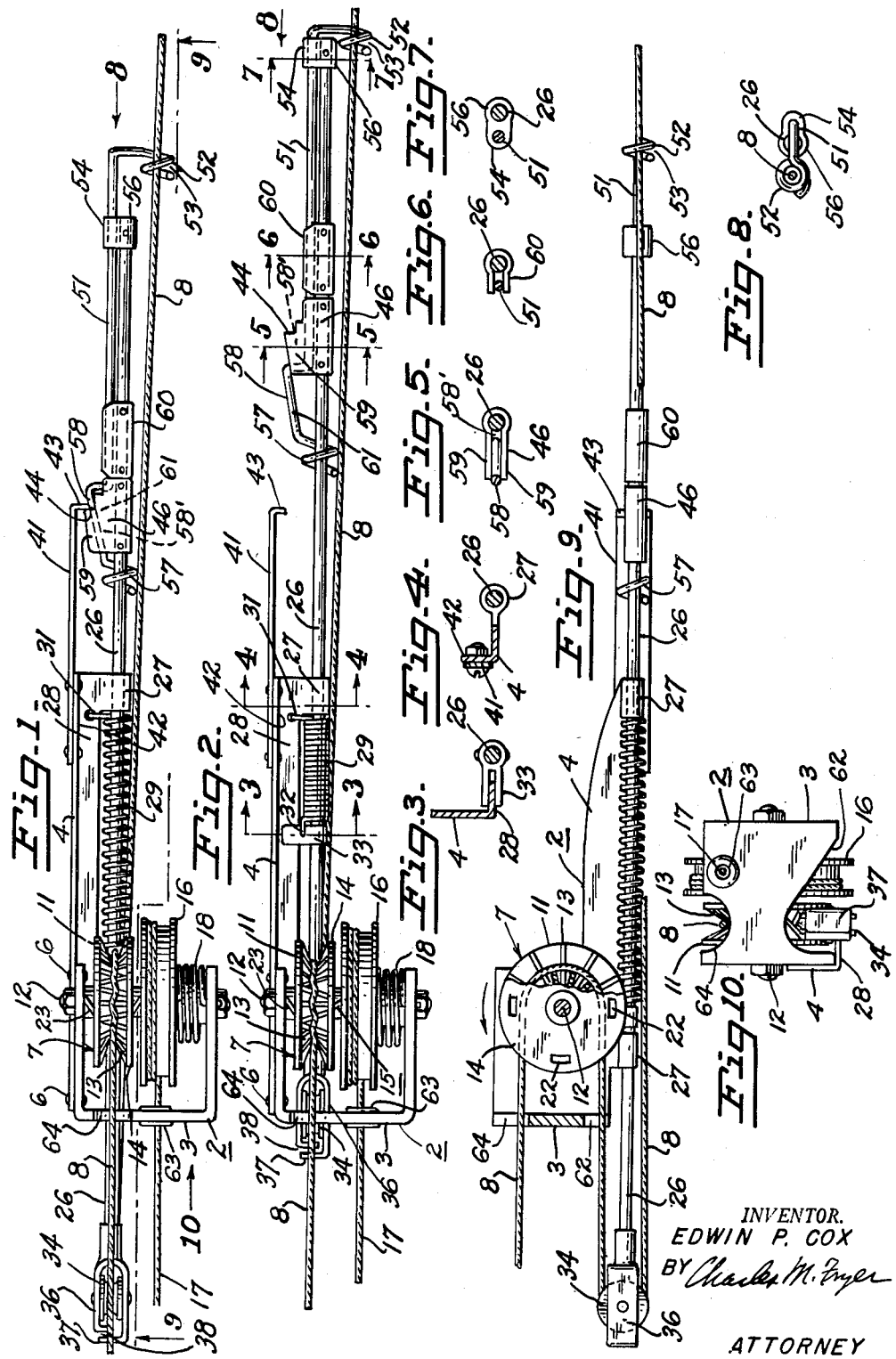
INVENTOR.
EDWIN P. COX
BY Charles M. Fryer
ATTORNEY

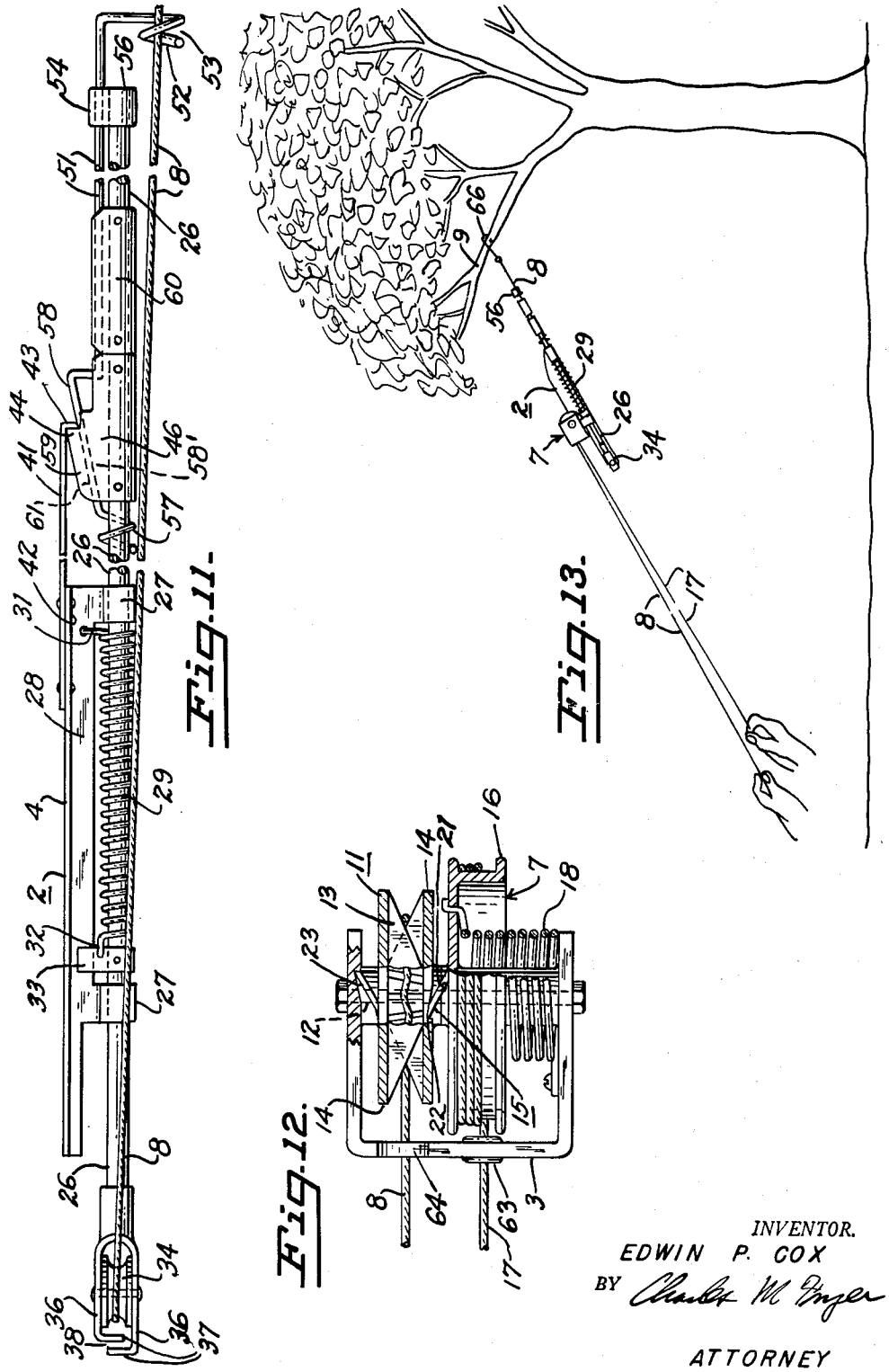

Patented Aug. 19, 1952

2,607,149

UNITED STATES PATENT OFFICE 2,607,149

DEVICE FOR DISENGAGING FISHHOOKS
OR THE LIKE

Edwin P. Cox, Los Angeles, Calif.

Application February 3, 1950, Serial No. 142,238

16 Claims. (Cl. 43—4)

This invention relates to a device for disengaging a caught object such as a fish hook, and more particularly to a device of such character adapted for use on a fish line attached to a fish hook caught on an object on land or above water.

In fishing, fishermen occasionally foul their lines during casting or otherwise because of the fish hooks becoming caught on objects, such as the branch or limb of a tree or on a rock located on land or projecting above water in a stream. If the object is inaccessible and the line cannot be released by other means, the fisherman may have to cut the line. This invention is designed to obviate such problem, and has as its objects, among others, the provision of a relatively simple and inexpensive device which can be mounted on a fouled line and travel along the line until it reaches the caught fish hook or other caught object attached to the line to disengage the same.

Summarizing the invention, the device comprises a frame having means enabling the device to travel along a line attached to a caught fish hook or other caught object. Hammer mechanism is mounted on the frame for movement from a retracted position to a projected position and vice versa; and resilient means is provided for continually urging the hammer mechanism to the projected position. Latch mechanism is also employed for holding the hammer mechanism in retracted position against the action of the resilient means. When the device is mounted on the fish line, the latch mechanism is set to hold the hammer mechanism in retracted position, and when the device contacts the caught fish hook, automatic means is actuated to release the latch mechanism and thereby effect projection of the hammer mechanism by the resilient means. Projection of the hammer mechanism results in its striking the caught fish hook, and will in most instances result in effecting release of the same.

Referring to the drawings:

Fig. 1 is a plan view of the device in the position wherein the hammer mechanism is latched.

Fig. 2 is a similar view with the hammer mechanism released and in projected position;

Fig. 3 is a section taken in the plane indicated by line 3—3 in Fig. 2;

Fig. 4 is a section taken in a plane indicated by line 4—4 in Fig. 2;

Fig. 5 is a section taken in a plane indicated by line 5—5 in Fig. 2;

Fig. 6 is a section taken in a plane indicated by line 6—6 in Fig. 2;

Fig. 7 is a section taken in a plane indicated by line 7—7 in Fig. 2;

Fig. 8 is an end elevation looking in the direction of arrow 8 in Fig. 2;

Fig. 9 is a sectional elevation taken in a plane indicated by line 9—9 in Fig. 1, with parts omitted for purpose of clarity;

Fig. 10 is an end elevation looking in the direction of arrow 10 in Fig. 1;

Fig. 11 is an enlarged plan view of the hammer mechanism part of the device;

Fig. 12 is an enlarged plan view, partly in section and partly broken away, of the motor mechanism part of the device;

Fig. 13 is a pictorial view illustrating the action of the device of this invention.

The device comprises a frame 2 including a U-shaped part 3 and an elongated part 4 which may be formed integrally but are shown as parts detachably connected together by cap screws 6. U-shaped part 3 of the frame supports means, generally indicated by reference numeral 7, enabling the device to travel along the fish line 8, the hook of which may be caught on a tree limb 9 as illustrated pictorially in Fig. 13.

As can be seen more clearly from Figs. 1, 2 and 12, such means 7 comprises a pulley 11 journalled for rotation about shaft 12 fixedly supported in frame part 3. Pulley 11 is of such construction as to provide firm frictional engagement with the fish line 8 when such line is positioned about the pulley, as indicated in Fig. 10; and any suitable construction may be provided for this purpose. The preferred construction illustrated comprises radially extending and inter-meshed spokes 13 integral with pulley side plates 14. These spokes have their edges slanting inwardly from the periphery of side plates 14; and as a result of the slant and the inter-meshing of the spokes the fish line will be gripped frictionally at its sides and will engage such spokes in a zigzag line. Hence, the line will not slip even though it may be wet or greasy.

Means is provided for driving pulley 11 to move the device along the line. Preferably, such means comprises a spring motor which can be energized manually and which has a one way clutch driving connection 15 with pulley 11. For this purpose, a spool 16 is also journalled for rotation about shaft 12 and has fixedly secured to the periphery thereof an operating cord 17 which is wound about the spool, so that upon manual pulling of the cord the spool can be rotated. A torsion spring 18 is connected between frame part 3 and one side of the spool; and upon pulling of cord 17, the spring will be energized and will effect driving of the spool in one direction upon release of cord 17.

The one way clutch driving connection 15 is provided between one side of spool 16 and the adjacent side of pulley 11, and is conveniently in the form of conventional ratchet mechanism including teeth 21 which allow the spool to move freely past the pulley 11 in one direction of rotation thereof when spring 18 is energized by pulling of cord 17. When cord 17 is released, this results in the teeth engaging in suitable recesses 22 in the side of the pulley to cause the driving connection between the spool and the pulley in the direction of rotation indicated by the direction arrow in Fig. 9. Hence, by repeated pulling of cord 17, the device is caused to travel along the line to the right with reference to Fig. 9.

To prevent slippage of pulley 11 when spool 16 is rotated by cord 17 to energize spring 18, a similar one way ratchet mechanism 23 is provided between the opposite side of pulley 11 and the inside of frame part 3. Such ratchet mechanism 23 thus serves as a one way brake, and allows pulley 11 to be driven by motor spring 18 after it has been energized and the cord 17 released.

Hammer mechanism, and latching mechanism and release mechanism therefor, are supported on elongated frame part 4. Such hammer mechanism comprises a rod 26 which is slidably mounted in spaced bearings 27 secured to one of the flanges 28 of frame part 4 which is preferably in the form of an angle member. Rod 26 extends beyond each of the opposite ends of frame part 4, and is continually resiliently urged to a projected position, illustrated in Fig. 2, by means of a tension spring 29 about rod 26 and connected between frame part 4 at one end 31 and to rod 26 at its opposite end 32; the connection to the rod being on a guide member 33 which engages flange 28 of frame part 4 to prevent turning of the rod. Although a tension spring is shown, a compression spring may be employed if so desired, interposed between the right bearing 27 appearing in the drawings and a member secured to the rod.

At its rear end, hammer rod 26 supports a guide pulley 34 about which the fish line 8 may be positioned in a manner to be subsequently described. Side guide plates 36 are positioned at the sides of pulley 34 and are provided with inturned ends 37 spaced apart at 38 to allow the fish line 8 to be positioned between plates 36 and about guide pulley 34.

Hammer rod 26 can be releasably held in retracted position against the action of spring 29 by means of a latch member 41 in the form of a leaf spring, and which is secured to flange 42 of frame part 4 and is provided with a finger 43 adapted to engage a projection 44 on latch member 46 fixedly secured to hammer rod 26 in front of frame part 4. When latch finger 43 engages over projection 44, hammer rod 26 is held in retracted position, as shown in Fig. 1.

The means for automatically releasing the latch mechanism comprises a rod 51 slidably supported on the front part of hammer rod 26 for movement relative thereto. The front part of release rod 51 is formed as an eye 52 having an opening 53 to enable the fish line 8 to be positioned in the eye; and release rod 51 is slidably supported at its front end in a bearing 54 formed in hammer head 56 fixedly secured to the front end of hammer rod 26. At its rear end, release rod 51 is formed with a coil 57 about hammer rod 26 to provide a slidable support for such rear portion of the release rod. To prevent turning of release rod 51, a raised portion 58 thereof is guided in a guideway 58', formed by side plate members 59 forming part of latch member 46, and also in a similar guide member 60.

When the latch mechanism is engaged, as illustrated in Fig. 1, it can be released upon rearward movement of release rod 51 relative to hammer rod 26 by means of a downwardly and rearwardly sloping cam surface 61 formed on raised portion 58 of release rod 51. This is so because rearward movement of release rod 51 causes cam surface 61 to act on finger 43 and lift the same free of engagement with projection 44. Immediately upon disengagement of the latch mechanism the loaded spring 29 will act to project the entire hammer mechanism 26 forwardly and cause it to strike a forceful blow against any object.

With reference to Fig. 10, it will be observed that the rear part of U-shaped frame part 3 is provided with a lower recess 62 to accommodate rod 26 and guide pulley 34. An aperture 63 is also provided for guiding the motor actuating cord 17 in line with spool 16; and an upper recess 63 is provided in frame part 3 to allow passage of the fish line 8.

Operation

When, for example, the hook on fish line 8 is caught in the limb of a tree, the device is first cocked to latch the hammer mechanism in the position shown in Fig. 1, by moving release rod 51 forwardly so that it projects in front of hammer rod 26 and cam 61 cannot engage finger 43, and by pushing hammer rod 26 rearwardly to cause latch members 43 and 44 to engage. At the same time, such rearward movement of the hammer rod loads spring 29 and positions guide pulley 34 rearwardly of the frame of the device. With the parts in this position, line 8 is held slack by the fisherman, and eye 52 is positioned about the line by inserting the line through opening 53 of the eye. The line is next passed once about guide pulley 34 by insertion through opening 38, and the line is also positioned under, around and once over drive pulley 11 as indicated in Fig. 9.

After the device is positioned on the line, the line is manually held taut by pulling the line at a location rearwardly of the device; and when taut the device will be firmly supported on the line by virtue of its support at its ends by guide pulley 34 and by eye 52, and by intermediate support through drive pulley 11. With the line held taut, the motor mechanism is energized by repeatedly pulling the actuating cord 17 back and forth, which results in travel of the device along the line toward the caught fish hook 66. In this connection, cord 17 may be long enough so that the device can be operated from a remote position if the operator cannot get sufficiently close to the end of the line which is caught.

As soon as the device contacts the caught fish hook by virtue of engagement of eye 52 with the fish hook, the device will not be able to travel further along the line but release rod 51 will be moved rearwardly relative to the hammer rod 26 to cause cam 61 to lift finger 43 and release the latch mechanism. Immediately upon release of the latch mechanism, spring 29 will cause the hammer rod to be projected forwardly, automatically placing slack in the line by virtue of forward movement of guide pulley 34 mounted on the hammer rod.

At the same time projection of the hammer rod forwardly results in head 56 thereon striking a forceful blow against the caught hook 66, and in most instances releasing the same the first time. The simultaneous automatic placing of slack in the line as the hammer rod strikes the hook, is important in insuring that the hook will be free to be released when struck by the hammer rod.

If not released in the first instance, slack may be put in the fish line by the operator so that the device can lower itself down the line by gravity, and the same operation may be effected until the fish hook is released. Although the device is particularly adapted for disengaging a fouled or caught fish hook attached to a fish line, it is apparent that it can be employed on any other lines attached to objects, such as kite sticks, which might be caught.

I claim:

1. A device for disengaging a caught object attached to a line comprising a frame, means including a pulley on said frame enabling said device to be mounted and supported on said line for travel along said line toward said object, hammer mechanism mounted on said frame for movement from a retracted position to a projected position and vice versa, resilient means urging said hammer mechanism to projected position, latch mechanism for holding said hammer mechanism in retracted position against the action of said resilient means, and means for releasing said latch mechanism to effect projection of said hammer mechanism by said resilient means.

2. A device for disengaging a caught object attached to a line comprising a frame, means including a pulley on said frame enabling said device to be mounted and supported on said line for travel along said line toward said object, a hammer rod slidably mounted on said frame for movement from a retracted position to a projected position and vice versa, resilient means urging said rod to projected position, latch mechanism for holding said rod in retracted position against the action of said resilient means, and means for automatically releasing said latch mechanism to effect projection of said rod by said resilient means.

3. A device for disengaging a caught object attached to a line comprising a frame, means including a pulley on said frame enabling said device to be mounted and supported on said line for travel along said line toward said object, a hammer rod slidably mounted on said frame for movement from a retracted position to a projected position and vice versa, resilient means urging said rod to projected position, latch mechanism comprising a member on said frame for engaging a member on said rod to hold said rod in retracted position against the action of said resilient means, and means for automatically releasing said latch mechanism upon contact of said device with said object to effect projection of said rod by said resilient means.

4. A device for disengaging a caught object attached to a line comprising a frame, means including a pulley on said frame enabling said device to be mounted and supported on said line for travel along said line toward said object, a hammer rod slidably mounted on said frame for movement from a retracted position to a projected position and vice versa, resilient means acting between said rod and said frame urging said rod to projected position, latch mechanism comprising a member on said frame for engaging a member on said rod to hold said rod in retracted position against the action of said resilient means, and means for automatically releasing said latch mechanism to effect projection of said hammer rod by said resilient means comprising a release member associated with and movable relative to said hammer rod and having means to disengage said latch members, said release member also having guide means to engage the line as said device travels therealong.

5. A device for disengaging a caught object attached to a line comprising a frame, means including a pulley on said frame enabling said device to be mounted and supported on said line for travel along said line toward said object, a hammer rod slidably mounted on said frame for movement from a retracted position to a projected position and vice versa, resilient means acting between said rod and said frame urging said rod to projected position, latch mechanism comprising a member on said frame for engaging a member on said rod to hold said rod in retracted position against the action of said resilient means, and means for automatically releasing said latch mechanism to effect projection of said hammer rod by said resilient means comprising a release rod slidably mounted for movement relative to said hammer rod and having a member to disengage said latch members, said release rod also having guide means at the front end thereof to engage said line as said device travels therealong.

6. A device for disengaging a caught object attached to a line comprising a frame, means including a pulley on said frame enabling said device to be mounted and supported on said line for travel along said line toward said object, a hammer rod slidably mounted on said frame for movement from a retracted position to a projected position and vice versa, resilient means acting between said rod and said frame urging said rod to projected position, latch mechanism comprising a member on said frame for engaging a member on said rod to hold said rod in retracted position against the action of said resilient means, and means for automatically releasing said latch mechanism to effect projection of said hammer rod by said resilient means comprising a release rod slidably supported by said hammer rod and having a member to disengage said latch members, said release rod being adapted in one position thereof to project in front of said hammer rod and contact said object and upon such contact to be moved toward said latch members, said release rod also having guide means at the front end thereof to engage the line as said device travels therealong.

7. A device for disengaging a caught object attached to a line comprising a frame, means including a pulley on said frame enabling said device to be mounted and supported on said line for travel along said line toward said object, a hammer rod slidably mounted on said frame for movement from a retracted position to a projected position and vice versa, said rod extending beyond each of opposite ends of said frame, means urging said rod to projected position, latch mechanism for holding said rod in retracted position against the action of said urging means, means for releasing said latch mechanism to effect projection of said rod by said urging means, and means mounted adjacent the rear end of said rod on which said line is adapted to be positioned for effecting slack in said line upon projection of said hammer rod from said retracted position.

8. A device for disengaging a caught object attached to a line comprising a frame, means on said frame enabling said device to be mounted and supported on said line for travel along said line toward said object, a hammer rod slidably mounted on said frame for movement from a retracted position to a projected position and vice versa, said rod extending beyond each of opposite ends of said frame, resilient means acting between said rod and said frame urging said rod to projected position, latch mechanism for holding said rod in retracted position against the action of said resilient means, means for automatically releasing said latch mechanism to effect projection of said hammer rod by said resilient means comprising a release rod slidably mounted for movement relative to said hammer rod, said release rod being adapted in one position thereof to project in front of said hammer rod and contact said object and upon such contact to be moved toward said latch mechanism, means mounted adjacent the rear end of said hammer rod on which said line is adapted to be positioned, for effecting slack in said line upon projection of said hammer rod from said retracted position, and guide means at the front end of said release rod on which said line is adapted to be positioned.

9. A device for disengaging a caught object attached to a line comprising a frame, means on said frame enabling said device to travel along said line toward said object, a hammer rod slidably mounted on said frame for movement from a retracted position to a projected position and vice versa, said rod extending beyond each of opposite ends of said frame, resilient means acting between said rod and said frame urging said rod to projected position, latch mechanism for holding said rod in retracted position against the action of said resilient means, means for automatically releasing said latch mechanism to effect projection of said hammer rod by said resilient means comprising a release rod slidably mounted for movement relative to said hammer rod, said release rod being adapted in one position thereof to project in front of said hammer rod and contact said object and upon such contact to be moved toward said latch mechanism, a pulley mounted adjacent the rear end of said hammer rod about which said line is adapted to be positioned, and an eye at the front end of said release rod through which said line is adapted to be positioned.

10. A device for disengaging a caught object attached to a line comprising a frame, a pulley mounted on said frame adapted to engage said line and effect travel of said device along said line toward said object upon rotation thereof, means mounted on said frame to drive said pulley, hammer mechanism mounted on said frame for movement from a retracted position to a projected position and vice versa, means urging said hammer mechanism to said projected position, latch mechanism for holding said hammer mechanism in retracted position against the action of said urging means, and means for releasing said latch mechanism to effect projection of said hammer mechanism by said resilient means.

11. A device for disengaging a caught object attached to a line comprising a frame, a pulley mounted on said frame adapted to engage said line and effect travel of said device along said line toward said object upon rotation thereof, a spring motor mounted on said frame to drive said pulley, hammer mechanism mounted on said frame for movement from a retracted position to a projected position and vice versa, resilient means urging said hammer mechanism to said projected position, latch mechanism for holding said hammer mechanism in retracted position against the action of said resilient means, and means for automatically releasing said latch mechanism to effect projection of said hammer mechanism by said resilient means.

12. A device for disengaging a caught object attached to a line comprising a frame, a pulley mounted on said frame adapted to engage said line and effect travel of said device along said line toward said object upon rotation thereof, a spring motor mounted on said frame and having a one way clutch driving connection with said pulley to drive the same, manually operable means including a cord for energizing said motor, hammer mechanism mounted on said frame for movement from a retracted position to a projected position and vice versa, resilient means urging said hammer mechanism to said projected position, latch mechanism for holding said hammer mechanism in retracted position against the action of said resilient means, and means for automatically releasing said latch mechanism to effect projection of said hammer mechanism by said resilient means.

13. A device for disengaging a caught object attached to a line comprising a frame, a pulley mounted on said frame adapted to engage said line and effect travel of said device along said line toward said object upon rotation thereof, a spring motor mounted on said frame and having a one way clutch driving connection with said pulley to drive the same, manually operable means including a cord for energizing said motor, a hammer rod slidably mounted on said frame for movement from a retracted position to a projected position and vice versa, said rod extending beyond each of opposite ends of said frame, resilient means acting between said rod and said frame urging said rod to projected position, latch mechanism comprising a member on said frame for engaging a member on said rod to hold said rod in retracted position against the action of said resilient means, means for automatically releasing said latch mechanism to effect projection of said hammer rod by said resilient means comprising a release rod slidably mounted for movement relative to said hammer rod and having means to disengage said latch mechanism, means mounted adjacent the rear end of said hammer rod on which said line is adapted to be positioned, and means adjacent the front end of said release rod on which said line is adapted to be positioned.

14. A device for disengaging a caught object attached to a line comprising a frame, a hammer rod mounted on said frame for movement from a retracted position to a projected position and vice versa, means urging said rod to projected position, latch mechanism for holding said rod in retracted position against the action of said urging means, means for releasing said latch mechanism to effect projection of said rod by said urging means; and means enabling said device to be supported on and to travel along said line, including a pulley mounted on said frame, and a supporting member mounted adjacent the rear of said rod, said line being adapted to be positioned around said supporting member and around said pulley whereby slack is adapted to be produced in said line upon projection of said hammer rod from said retracted position.

15. A device for disengaging a caught object attached to a line comprising a frame, means including a pulley on said frame enabling said device to be mounted and supported on said line for travel along said line toward said object, a hammer rod slidably mounted on said frame for movement from a retracted to a projected position and vice versa, means urging said hammer rod to said projected position, latch mechanism for holding said hammer rod in retracted position against the action of said urging means; and means for automatically releasing said latch mechanism comprising a release rod slidably mounted for movement relative to said hammer rod, said release rod having at its rear end a member to release said latch mechanism upon rearward movement of said release rod relative to said hammer rod, and the front of said device having guide means to engage said line and guide the hammer rod substantially in line with said object.

16. A device for disengaging a caught object attached to a line comprising a frame, means including a pulley on said frame enabling said device to be mounted and supported on said line for travel along said line toward said object, a hammer rod slidably mounted on said frame for movement from a retracted to a projected position and vice versa, means urging said hammer rod to said projected position, latch mechanism for holding said hammer rod in retracted position against the action of said urging means; and means for automatically releasing said latch mechanism comprising a release rod slidably mounted for movement relative to said hammer rod, said release rod having at its rear end a member to release said latch mechanism upon rearward movement of said release rod relative to said hammer rod, and the front of said device having guide means to engage said line and guide the hammer rod substantially in line with said object; the rear end of said hammer rod having means to engage said line for effecting slack in said line upon projection of said hammer rod from said retracted position.

EDWIN P. COX.

REFERENCES CITED

The following references are of record in the file of this patent:

UNITED STATES PATENTS

| Number | Name | Date |
| --- | --- | --- |
| 913,677 | Ainsworth | Mar. 2, 1909 |
| 947,391 | Michael | Jan. 25, 1910 |
| 2,194,016 | Geller | Mar. 19, 1940 |